April 7, 1959   P. NOTTMEYER   2,880,563
ROTARY LAWN MOWER WITH GRASS GUIDE
Filed June 7, 1957
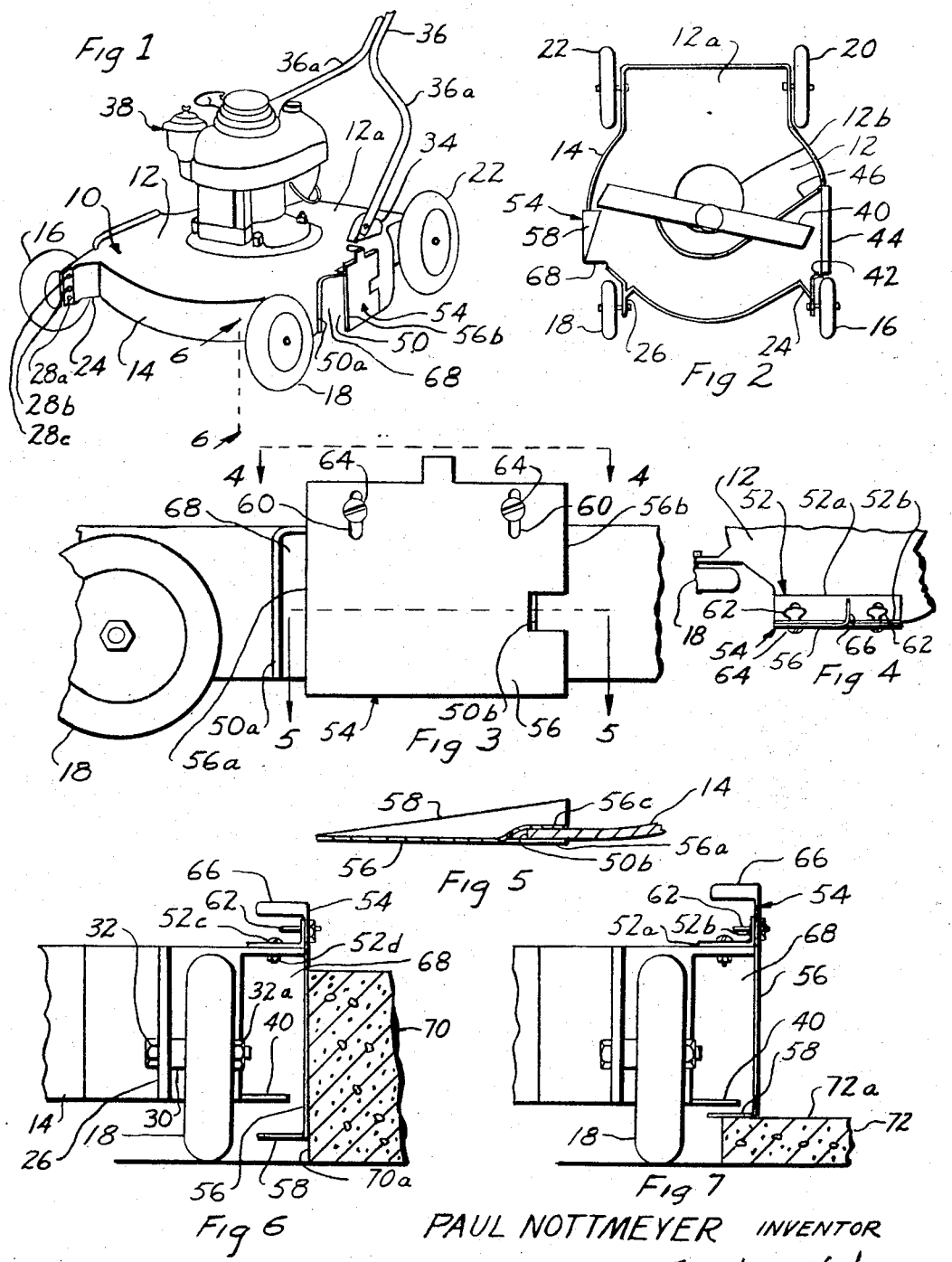
PAUL NOTTMEYER INVENTOR
BY Frost and Verhoeven
ATTORNEYS United States Patent Office 2,880,563
Patented Apr. 7, 1959

2,880,563

ROTARY LAWN MOWER WITH GRASS GUIDE

Paul Nottmeyer, Hoffman, Ill., assignor to Lawncraft Manufacturing Corporation, Hoffman, Ill., a corporation of Illinois Application June 7, 1957, Serial No. 664,413

2 Claims. (Cl. 56—25.4)

My invention relates to a rotary lawn mower having a grass guide which can be selectively positioned to draw grass from adjacent a vertical obstruction into the orbit of the blade and can raise grass overlying a horizontal obstruction and guide it into the orbit of the blade.

The most difficult aspect of mowing a lawn lies in cutting the grass which lies adjacent walls, walks, or other similar obstructions. Among the typical obstructions which may be encountered are those like walls which consist of vertical surfaces against which the grass grows while others, like walks, consist of horizontal surfaces over which the grass adjacent the surface may lie. The grass adjacent these obstructions may be trampled down to make the cutting even more difficult. When conventional lawn mowers are used the grass adjacent these surfaces must generally be trimmed with hand cutters or mowers specially designed for this trimming operation.

With the rotary lawn mower of the present invention grass growing in an open area can be cut, as with conventional rotary mowers, and, in addition, the grass adjacent obstructions can be conveniently trimmed, obviating the need for hand cutting or special trimming mowers. The mower of the present invention can trim the grass, even if it is trampled down, and can operate equally as effectively adjacent vertical and horizontal obstructions. Grass growing adjacent vertical obstructions, whatever its condition, can be guided into the mower and grass which grows adjacent to and overlies a horizontal obstruction can be picked up and guided into the mower.

In brief, the mower of the present invention comprises a wheeled housing of generally circular conformation within which a blade rotates in a plane horizontal to the ground. The housing, at one side, extends outboard of the wheels and has a slot. The slot is positioned in the side of the housing so that a portion of the slot extends transversely to the mower so that grass will pass into the slot as the mower is pushed forward. A grass guide is located at the side of the housing behind the slot. The grass guide has a vertical portion, defining a face, and a horizontal portion defining a forwardly tapering face extending inwardly to lie below the plane of the rotating blade and behind the slot in the side of the housing. The grass guide has means by which the horizontal face can be readily moved vertically to alter its position in relation to the ground and the rotating blade.

With this construction, the mower, when guided along a vertical obstruction, will guide grass adjacent that obstruction into the orbit of the blade within the housing. If the grass is bent or trampled down the horizontal face of the grass guide can be readily lowered to get under the grass and guide it into the cutting orbit. It grass is growing adjacent a horizontal obstruction and is bent to overlie that obstruction, the grass guide can be lowered to ride on the surface of the horizontal obstruction. In this manner the overlying grass is readily picked up and fed into the mower.

The wheels of the rotary mower may be vertically adjustable in relation to the housing, and hence in relation to the plane of the rotating blade. In this manner the rotating blade, as well as the cooperating grass guide, is adjustable in relation to the ground. Since the guide is also selectively adjustable in relation to the blade a wide variety of trimming operations can be conveniently achieved with the mower. The grass adjacent obstructions can be trimmed close or cut to a selected height as desired and the grass guide can be adjusted vertically to provide the most effective action for the cut desired.

It is therefore a general object of the present invention to provide a rotary lawn mower which can cut grass adjacent obstructions.

It is another object of the present invention to provide a rotary lawn mower which can selectively trim grass adjacent a vertical surface and overlying a horizontal surface.

It is yet another object of the present invention to provide a rotary lawn mower capable of picking up bent or trampled grass adjacent obstructions and feeding it into the mower for cutting.

It is a further object of the present invention to provide a grass guide having means for quick and easy vertical adjustment in relation to the blade and the ground.

It is an additional object of the present invention to provide a rotary lawn mower capable of effective trimming close to obstructions in which the rotating cutting blade and cooperating grass guide are both adjustable in relation to the ground and are adjustable in relation to each other.

It is still another object of the present invention to provide a rotary lawn mower equally capable of general grass cutting and trimming close to obstructions which is of simple construction, effective in its operation, and easy and convenient to operate.

The novel features which I believe to be characteristic of my invention are set forth with particularity in the appended claims. My invention itself, however, both as to its organization and method of operation, together with further objects and advantages thereof, will best be understood by reference to the following description taken in conjunction with the accompanying drawings in which:

Figure 1 is a view in perspective of the rotary lawn mower of the present invention;

Figure 2 is a bottom plan view of the mower of Figure 1;

Figure 3 is a side fragmentary elevational view on an enlarged scale of the mower of Figure 1 showing the installation of the grass guide;

Figure 4 is a view on a reduced scale through section 4—4 of Figure 3;

Figure 5 is a view through section 5—5 of Figure 3;

Figure 6 is a view on an enlarged scale through section 6—6 of Figure 1 showing the grass guide in a lowered position; and Figure 7 is a view similar to the view of Figure 6 showing the grass guide in a raised position.

The rotary lawnmower of the present invention is shown in Figure 1. The mower has a housing, shown generally at 10, consisting of a top plate 12 and a skirt 14 depending from the margins of the plate 12. The top plate is generally circular in conformation but has a rear portion 12a of generally rectangular shape as shown best in Figure 2. The housing is supported above the ground, with top plate 12 lying in a generally horizontal plane, by wheels 16, 18, 20 and 22.

The front wheels 16 and 18 are connected, respectively, to forwardly extending flanges 24 and 26 located adjacent the sides of the mower. Each flange has three vertically spaced holes 28a, 28b, and 28c by which the wheels can be connected to the flanges for selective positioning of the housing above the ground. The rear wheels 20 and 22 are connected, respectively, on each side of the housing to the flange 14 depending from the rectangular portion 12a of the top plate 12. The flange 14, on each side, also has three vertically spaced holes (not shown) which can selectively receive the wheels. Each wheel has an axle 30 which receives a bolt 32. The bolt 32 passes through one of the holes in the housing and, with nut 32a, rotatably attaches the wheels to the housing.

A lug 34 is located on the upper surface of top plate 12 adjacent each side of the mower to receive the legs 36a. The legs 36a are pivotally connected to the lugs 34 and are bent to join and define a handle 36 for the mower. The top plate 12 of the housing has a centrally disposed opening 12b. A gasoline engine 38, or other suitable power means, is connected to the upper surface of the housing above the opening 12b.

As shown in Figure 2, a blade 40 within the housing is connected to the power means to rotate in a horizontal plane and define a circular orbit. An opening 42 in the skirt 14 on one side of the housing defines a grass discharge opening. A cover plate 44 having openings (not shown) to pass the grass is connected across the opening 42. A curved flange 46 depends from the underside of the top plate 12, between the opening 12b and the front of the mower. The flange 46 extends from the rear of opening 42 to the other side of opening 12b and defines a discharge passage for the cut grass.

On the opposite side of the housing from opening 42 is another opening 50 in the depending skirt 14. The opening 50 has a forward margin 50a and a rear margin 50b. The opening 50 has a portion which extends in a direction transverse to the direction of travel of the mower. A bracket 52 is connected to top plate 12 adjacent the edge and over the rear portion of the opening 50. The bracket 52 has a horizontal leg 52a which is connected to top plate 12 by screws 52c and nuts 52d. The bracket 52 also has a vertical leg 52b which is in general tangential relationship to the circular top plate 12. It should be noted that when the bracket 52 is mounted at the edge of the top plate 12 the vertical leg 52b lies outboard of the two wheels 18 and 22 on that side of the mower.

The grass guide 54 is connected to the housing over the rear portion of the opening 50. The grass guide 54 has a vertical portion 56, defining a vertical face, and a horizontal portion 58 defining a horizontal face. The vertical portion 56 has a forward side edge 56a and a rear side edge 56b. The vertical portion 56 has slots 60, aligned parallel to the sides 56a and 56b, adjacent its upper edge. The slots 60 receive screws 64 which pass through holes in the vertical leg 52b of the bracket 52 and are secured by wing nuts 62. At the upper edge of portion 56 is a tab 66 extending inwardly, normal to the portion 56. The rear side edge 56b of the vertical portion 56 has an off-set portion 56c. The rear margin 50b of the opening 50 is received between the offset portion 56c and the rear edge 56b to hold the grass guide 54 firmly, but in slidable relation with the skirt 14 of the housing. The forward side edge 56a lies outboard of the forward margin 50a of opening 50 to define a slot 68 extending transversely to the direction of normal travel of the mower. The horizontal portion 58 of the grass guide extends inwardly from the lower edge of the vertical portion 56. The portion 58 lies behind the slot 68 and below the plane of the cutting blade 40. As shown best in Figure 5 the horizontal portion 58 is tapered toward its forward end.

The mower of the present invention may be conveniently operated against a vertical obstruction, as shown in Figure 6, or alongside a horizontal obstruction, as shown in Figure 7. In operating the mower adjacent a vertical obstruction, such as 70 shown in Figure 6, the mower is guided so that the vertical face 56 of the grass guide 54 engages the obstruction to ride along the vertical surface 70a of the obstruction as the mower is pushed forward. The slot 68 will pass grass growing adjacent the obstruction 70 so it will contact the narrow end of the forwardly tapering horizontal face 58 and be guided into the orbit of the rotating blade 40 for cutting. It will be noted that by loosening wing nuts 62 the grass guide 54 can be readily raised or lowered with tab 66. In this manner the horizontal face 58 can be vertically adjusted in relation to the blade 40 for most effective cutting. If the grass adjacent the obstruction 70 is bent down or trampled the horizontal face 58 can be quickly positioned close to the ground where it will pick up the bent grass and feed it into the mower for cutting.

When it is desired to trim the grass adjacent a horizontal obstruction such as 72 having a horizontal face 72a, as shown in Figure 7, the grass guide 54 is adjusted so that the horizontal face 58 rides on the horizontal face 72a of the obstruction. When the horizontal face 58 is riding on the face 72a of the obstruction any grass which is bent to overlie the face 72a is picked up and fed into the orbit of the rotating blade 40. In this manner a clean trim is assured adjacent obstructions such as sidewalks.

It should be noted that the wheels of the mower are vertically adjustable in relation to the housing and hence in relation to the rotating blade 40. Thus the height of the blade 40 above the ground can be adjusted. Since the grass guide 54 is also adjustable in relation to the ground, the guide and the blade can be adjusted in reation to each other, regardless of the selected adjustment of the wheels. This assures a proper relationship between the blade and the horizontal face of the grass guide at all times for most effective cutting operation. Thus, with the wheels adjusted for cutting at a given height, the horizontal face of the grass guide can be adjusted wthout altering the height of the cut, to assure the most effective spacing between the guide and the blade, for the particular condition of the grass being cut.

While I have shown and described a specific embodiment of the present invention it will, of course, be understood that various modifications and alternative constructions may be made without departing from the true spirit and scope thereof. I therefore intend by the appended claims to cover all such modifications and alternative constructions as come within their true spirit and scope.

What I claim and desire to secure by Letters Patent of the United States is:

1. A rotary lawn mower for general grass cutting and for selectively trimming grass adjacent to and overlying obstructions comprising in combination: a housing of generally circular conformation having an opening in one side; a cutting blade rotatable in plane within the housing to define a circular orbit of predetermined grass cutting height; drive means mounted on the housing to rotate said blade; a bracket connected to the housing over said opening and having a face tangential to the outer periphery of said housing; a grass guide adjustably connected to said bracket, the grass guide having a vertical face covering the rear portion of the opening to define a slot in the housing forward of the grass guide, the face having an offset portion to slidably engage the rear margin of the opening, the guide further having a horizontal forwardly tapering grass lifting face extending inwardly from the lower edge of said vertical face and lying below the plane of the blade, to lift flattened grass to erect position in the path of travel of the blade, the guide having a tab for selectively raising and lowering the guide to alternately raise the horizontal face for engagement with the top of an obstruction and lower the horizontal face for engagement of the vertical face with the side of an obstruction; and wheels carrying said housing, the wheels supporting said one side of the housing lying inboard of the grass guide.

2. A rotary lawn mower for general grass cutting and for selectively trimming grass adjacent to and overlying obstructions comprising in combination: a housing of generally circular conformation having an opening in one side and terminating in a vertical wall; a cutting blade rotatable in a plane within the housing to define a circular orbit of predetermined grass cutting height; drive means mounted on the housing to rotate said blade; a grass guide adjustably connected to said housing, the grass guide having a vertical face in slidable engagement with the vertical wall of the opening, the vertical face of the guide and the vertical wall of the opening having interengaging slidably movable conformations in straddling relation to each other, the guide further having a horizontal forwardly tapering grass lifting face extending inwardly from the lower edge of said vertical face and lying below the plane of the blade to lift flattened grass to erect position into the path of travel of the blade, the guide having means for selectively raising and lowering the guide to alternately raise the horizontal face for engagement with the top of an obstruction and lower the horizontal face for engagement of the vertical face with side of an obstruction; and wheels carrying said housing, the wheels supporting said one side of the housing lying inboard the grass guide.

References Cited in the file of this patent

UNITED STATES PATENTS

| | | |
|---|---|---|
| 2,312,972 | Orr | Mar. 2, 1943 |
| 2,708,818 | Gentry et al. | May 24, 1955 |
| 2,711,064 | Parker | June 21, 1955 |
| 2,719,396 | Morris et al. | Oct. 4, 1955 |
| 2,763,116 | Flinchbaugh et al. | Sept. 18, 1956 |
| 2,796,715 | Meltzer | June 25, 1957 |